United States Patent
Ohashi (10) Patent No.: US 9,162,536 B2
(45) Date of Patent: Oct. 20, 2015

(54) PNEUMATIC TIRE

(75) Inventor: Toshiyuki Ohashi, Osaka (JP)

(73) Assignee: TOYO TIRE & RUBBER CO., LTD., Osaka-shi (JP)

(*) Notice: Subject to any disclaimer, the term of this patent is extended or adjusted under 35 U.S.C. 154(b) by 1027 days.

(21) Appl. No.: 13/284,586

(22) Filed: Oct. 28, 2011

(65) Prior Publication Data

US 2012/0103484 A1    May 3, 2012

(30) Foreign Application Priority Data

Nov. 2, 2010   (JP) .................................. 2010-246642

(51) Int. Cl.
 B60C 11/24   (2006.01)
 B60C 11/12   (2006.01)

(52) U.S. Cl.
 CPC ............ B60C 11/24 (2013.01); B60C 11/1204 (2013.04); B60C 11/1236 (2013.04); B60C 11/1281 (2013.04); B60C 2011/1286 (2013.04); Y10T 152/10027 (2015.01)

(58) Field of Classification Search
 CPC .... B60C 11/24; B60C 11/12; B60C 11/1204; B60C 11/1218; B60C 11/1236; B60C 11/1259; B60C 11/1263; B60C 11/1268; B60C 11/1272; B60C 11/1281; B60C 2011/1286; Y10T 152/10027
 USPC ....................................................... 152/154.2
 See application file for complete search history.

(56) References Cited

U.S. PATENT DOCUMENTS

| | | | |
|---|---|---|---|
| 3,653,422 A * | 4/1972 | French ....................... | 152/209.5 |
| 6,523,586 B1 | 2/2003 | Eromaki et al. | |
| 2005/0269003 A1 | 12/2005 | Fujii et al. | |
| 2006/0037683 A1 | 2/2006 | Cuny et al. | |
| 2006/0213594 A1 * | 9/2006 | Kemp et al. ................ | 152/154.2 |
| 2009/0008009 A1 * | 1/2009 | Mosko et al. ............... | 152/154.2 |
| 2009/0078350 A1 | 3/2009 | Ohashi | |

FOREIGN PATENT DOCUMENTS

| | | |
|---|---|---|
| JP | 2001-030721 A | 2/2001 |
| JP | 2006-056508 A | 3/2006 |
| WO | 2004/050390 A1 | 6/2004 |

* cited by examiner

*Primary Examiner* — Eric Hug
(74) *Attorney, Agent, or Firm* — Westerman, Hattori, Daniels & Adrian, LLP (57) ABSTRACT

A wear indicator provided on a tread surface is constituted of seven sipes of an uppermost sipe a lowermost sipe and an intermediate sipe each extending in a lateral direction; and an upper-left sipe an upper-right sipe a lower-left sipe and a lower-right sipe each extending in a longitudinal direction. The sipe uses a combination of an indication part used to indicate a character and a non-indication part having a narrower groove width and not used to indicate a character in a depth direction of the sipe. Single numeral is indicated by the combination of the indication parts in the seven sipes and the combination of the indication parts is changed in the depth direction of the sipe such that the numeral stepwise changes in the depth direction of the sipe.

9 Claims, 7 Drawing Sheets

PNEUMATIC TIRE

CROSS-REFERENCE TO RELATED APPLICATIONS

This application is based upon and claims the benefit of priority from the prior Japanese Patent Application No. 2010-246642, filed on Nov. 2, 2010; the entire contents of which are incorporated herein by reference.

BACKGROUND OF THE INVENTION

1. Technical Field

The present invention relates to a pneumatic tire, and particularly to a pneumatic tire having a wear indicator on a tread surface.

2. Background Art

Conventionally, a wear indicator indicating the state of progress of wear of a tread sometimes is provided on a tread surface of a pneumatic tire, and various technologies are proposed. For example, JP-A 2001-030721 discloses that a plurality of indicators having a different depth (for example, series of numeric strings) is provided side by side on a tread surface, and the numerals disappear in sequence with the progress of wear, thereby reading a wear amount (that is, residual depth of tread groove).

WO2004/050390 discloses the technology that a multi-stage hole is provided on a tread surface, and the contour shapes of the respective stages of the hole is changed to circle, square, triangle and the like, whereby a wear amount is indicated by the change of the contour shape of the hole with the progress of wear.

JP-A 2006-056508 proposes a wear indicator having a shape visually showing the wear amount and having a different shape in a depth direction as a wear indicator provided on a tread surface, and specifically discloses the constitution that pictorial symbols such as smiley face change to different pictorial symbols with the progress of wear.

However, the technology disclosed in JP-A 2001-030721 is that a cross-sectional shape of the indicator does not change in a depth direction. As a result, to indicate a wear amount, a plurality of indicators must be provided side by side, and this becomes a factor of uneven wear.

On the other hand, WO2004/050390 and JP-A 2006-056508 disclose to change a cross-sectional shape of the indicator with the progress of wear, but the wear amount such as residual depth of a groove is not easily indicated visually. JP-A 2006-056508 contains the description that a piled blade forming piled numerals indicating the level of wear of a tread may be used, but does not specifically disclose that how the piled numerals are formed.

SUMMARY OF THE INVENTION

The present invention has been made in view of the above points, and has an object to provide a pneumatic tire having a wear indicator that can visually easily indicate wear state.

The pneumatic tire according to the present invention has a wear indicator formed by a sipe on a tread surface. The wear indicator comprises seven sipes of an uppermost sipe extending in a lateral direction in an uppermost part, a lowermost sipe extending in a lateral direction in a lowermost part, an intermediate sipe extending in a lateral direction at an intermediate position between the uppermost sipe and the lowermost sipe, an upper-left sipe and an upper-right sipe, extending in a longitudinal direction connecting ends of the uppermost sipe and the intermediate sipe with each other, and a lower-left sipe and a lower-right sipe, extending in a longitudinal direction connecting ends of the lowermost sipe and the intermediate sipe with each other. The seven sipes each comprise an indication part having a first groove width and used to indicate a character, and a non-indication part having a second groove width smaller than the first groove width and not used to indicate a character, in combination in a depth direction of the sipe, or comprise the indication part in the entire depth direction of the sipe, at least one sipe comprising a combination of the indication part and the non-indication part. The wear indicator indicates a single character by the combination of the indication parts in the seven sipes, and is that the combination of the indication parts is stepwise changed in a depth direction of the sipe such that the character is stepwise changed in the depth direction of the sipe.

BRIEF DESCRIPTION OF THE DRAWINGS

FIGS. 5A to 5C are plane views at each wear stage of the wear indicator according to the first embodiment.

FIGS. 6A to 6C are perspective views of a molding blade for the wear indicator.

DETAILED DESCRIPTION OF THE INVENTION

A more preferred embodiment of the pneumatic tire is that at least one sipe has the indication part at a sipe bottom side of the non-indication part. The wear indicator may have at least three wear stages in a depth direction of the sipe, and indicate a different character in each wear stage. The character may be an Arabic numeral. In this case, the wear indicator may be set such that the numeral indicated becomes smaller toward the sipe bottom side. A further preferred embodiment is that the upper-left sipe and the lower-left sipe may be joined together and integrated to constitute a left side longitudinal sipe extending in the entire longitudinal direction, and the upper-right sipe and the lower-right sipe may be joined together and integrated to constitute a right side longitudinal sipe extending in the entire longitudinal direction. In this case, at least one of the right and left longitudinal sipes, and at least one of the uppermost, lowermost and intermediate sipes, extending in the lateral direction may be joined together and integrated to constitute a single sipe.

According to the present embodiment, a seven segment display-shaped indication structure is provided on the tread surface. Therefore, a wear state such as a residual groove depth can visually easily be indicated. Furthermore, the character is indicated using a sipe combining the indication part and the non-indication part in a depth direction. Therefore, various characters can be formed in the depth direction of the sipe while ensuring demoldability of a molding blade by the non-indication part having a narrow groove width when molding a tread.

The pneumatic tire according to the embodiment is described below by reference to the drawings.

First Embodiment

The pneumatic tire according to a first embodiment, although not shown, comprises a pair of right and left beads, a pair of right and left side wall parts, and a tread part 10 provided between both side wall parts so as to connect outer ends in a radial direction of the right and left side wall parts with each other. The tire has a carcass extending across a pair of the bead parts. The carcass comprises at least one carcass ply, which passes the side wall part from the tread part 10, the both ends of which being locked by a ring-shaped bead core, and reinforces the above each part. The bead core is embedded in the bead part. A belt comprising at least two layers of a rubber-coated steel cord layer is provided at an outer peripheral side of the carcass in the tread part 10, and the belt reinforces the tread part 10 at the outer periphery of the carcass.

Figure 1:
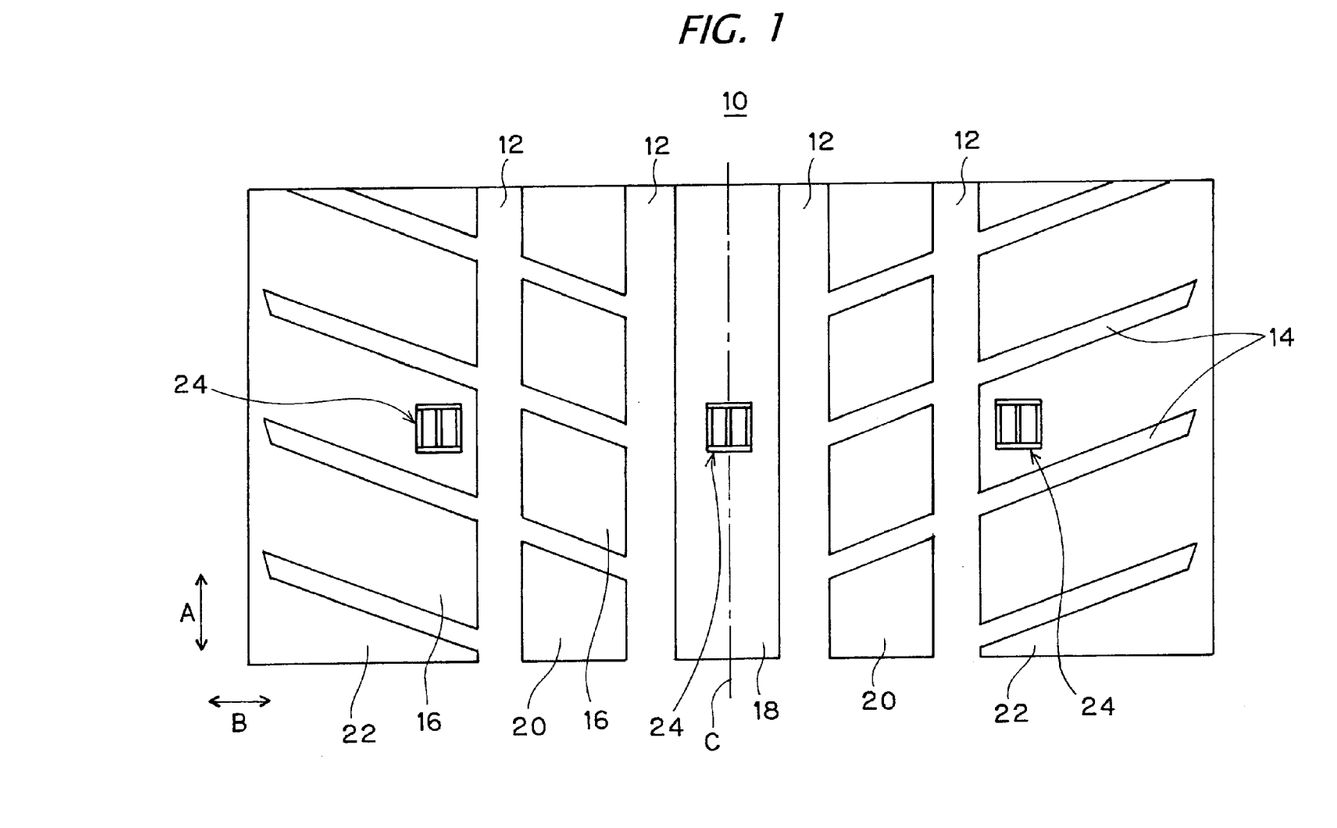
FIG. 1 is a development view showing a tread pattern of a tire according a first embodiment.

A plurality of circumferential grooves (main grooves) 12 extending in a tire circumferential direction A in a straight shape, and a plurality of transverse grooves 14 crossing the circumferential grooves 12 are provided on the surface of the tread part 10 as shown in FIG. 1. By this constitution, the tread part 10 has a plurality of blocks 16 partitioned by the circumferential grooves 12 and the transverse grooves 14. In this example, four circumferential grooves 12 are provided in a width direction B of the tire. By this constitution, the tread part 10 is partitioned to five regions of a rib-shaped center region 18 on a center line C of the tire, intermediate regions 20, 20 comprising a row of blocks formed on both sides of the center region 18 sandwiching the center region 18, and shoulder regions 22, 22 at both ends, comprising a row of blocks formed on further outside of the intermediate region 20, in a width direction B of the tire.

A wear indicator 24 for indicating a residual amount (a residual groove depth) of the circumferential groove 12 is provided on a rib which is a land part of the center region 18 and the block 16 which is a land part of the shoulder region 22, adjacent to the circumferential groove 12. In this example, the wear indicator 24 is provided at three sites of a center portion and both ends, in the width direction B of the tire. However, the wear indicator 24 may be provided at the center portion and one of the ends, only the center portion, only ends, and the like, and locations and the number of the wear indicator 24 in the width direction B of the tire are not particularly limited. The wear indicator 24 is provided at plural locations on the periphery of the tire. For example, the wear indicator 24 is provided on 4 to 10 locations at regular intervals on the periphery of the tire. However, the locations in the circumferential direction are not particularly limited.

Figure 2:
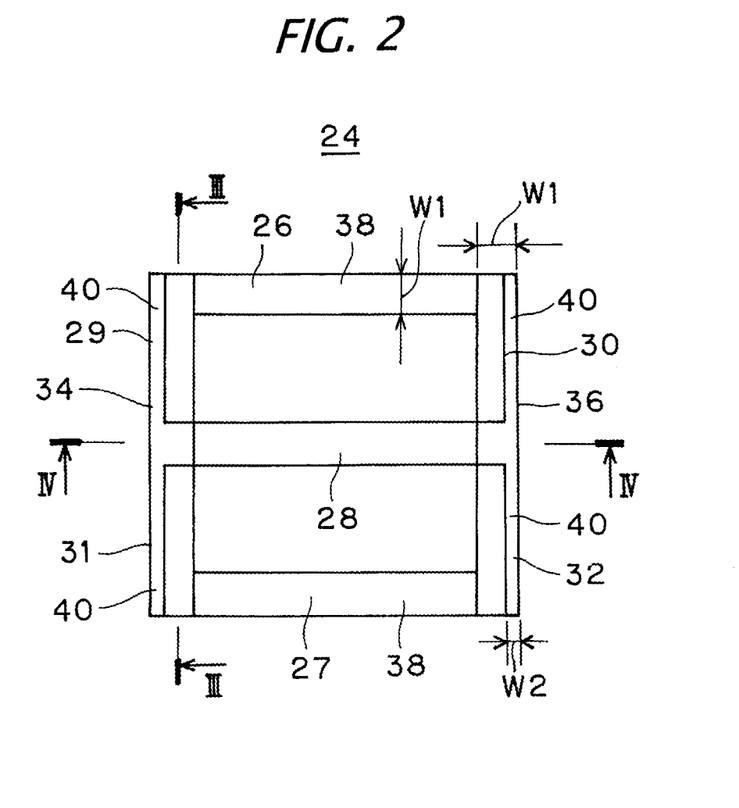
FIG. 2 is a plane view of a wear indicator according to the first embodiment.

The wear indicator 24 is provided on the surface of the land part of the tread part 10, such as a block or a rib, by the sipe (narrow groove), and is formed as follows. As shown in FIG. 2, the wear indicator 24 has a 7 segment display-shaped indication structure, and comprises seven sipes of an uppermost sipe 26 extending in a lateral direction in an uppermost part, a lowermost sipe 27 extending in a lateral direction in a lowermost part, an intermediate sipe 28 extending in a lateral direction at an intermediate position between the uppermost sipe 26 and the lowermost sipe 27, an upper-left sipe 29 and an upper-right sipe 30, extending in a longitudinal direction connecting ends of the uppermost sipe 26 and the intermediate sipe 28 with each other, and a lower-left sipe 31 and a lower-right sipe 32, extending in a longitudinal direction connecting ends of the lowermost sipe 27 and the intermediate sipe 28 with each other. The terms "uppermost part" and "lowermost part" used herein mean the uppermost part and the lowermost part as the wear indicator 24 (that is, the uppermost part and the lowermost part of seven segment displays), and are irrelevant to a positional relationship in the tire or the tread part 10. The terms "lateral direction", "longitudinal direction" and "right and left" are the same.

The uppermost sipe 26, the lowermost sipe 27 and the intermediate sipe 28 are sipes extending in a lateral direction in parallel to each other, and having the same length. The upper-left sipe 29 and the upper-right sipe 30 are sipes extending in a longitudinal direction in parallel to each other and having the same length. The lower-left sipe 31 and the lower-right sipe 32 are sipes extending in a longitudinal direction in parallel to each other and having the same length. By this constitution, the wear indicator 24 has the form that the external contour on the tread surface has a rectangular shape, and the intermediate sipe 28 crosses into the center portion of the upper and lower directions.

In this example, the upper-left sipe 29 and the lower-left sipe 31 are joined together and integrated to constitute a left side longitudinal sipe 34 linearly extending over the entire longitudinal direction. The upper-right sipe 30 and the lower-right sipe 32 are joined together and integrated to constitute a right side longitudinal sipe 36 linearly extending over the entire longitudinal direction.

The wear indicator 24 is constituted as follows so as to indicate characters (in the example, Arabic numerals 0 to 9).

The seven sipes 26 to 32 are set to two kinds that its groove width is a first groove width W1 and its groove width is a second groove width W2 smaller than the first groove width W1. The sipe part having the first groove width W1 is a part functioning as an indication part 38 used to indicate characters, and is set to have a sufficient groove width so as to visually recognize that a part of characters is indicated. Although not particularly limited, the first groove width W1 is preferably from 1.0 to 2.0 mm.

On the other hand, the sipe part having the second groove width W2 is a part functioning as a non-indication part 40 which is not used to indicate characters, and is set to have a small groove width so as not to be visually recognized that a part of characters is indicated. Although not particularly limited, the second groove width W2 is preferably ½ or less, and more preferably ⅓ or less, of the first groove width W1. Specifically, the second groove width W2 is preferably from 0.2 to 0.8 mm.

By the combination two kinds of sipe parts having a different groove width, seven sipes 26 to 32 indicate one character as a whole. Actually, because the non-indication part 40 having a small width does not function to indicate characters, a single character is indicated by the combination of the indication parts 38. By stepwise changing the combination of the indication parts 38 in a sipe depth direction H, the character indicated by the indication parts 38 is stepwise changed in the sipe depth direction H.

Figure 5A:
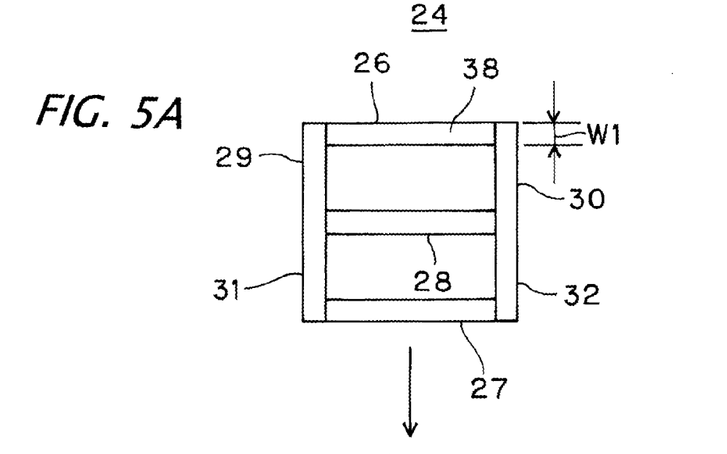
FIG. 5A is a plane view at a wear stage of a line A-A in FIG. 3.
Figure 5B:
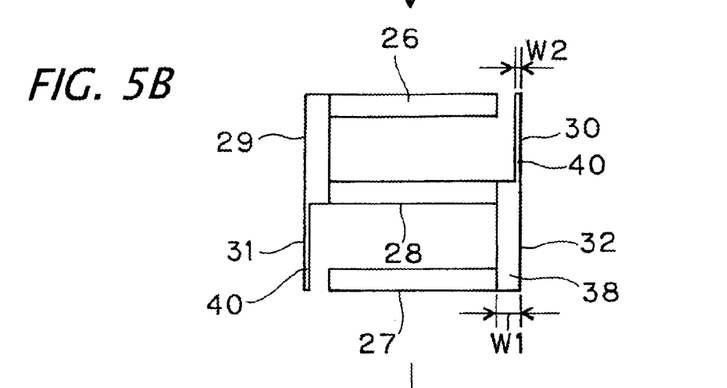
FIG. 5B is a plane view at a wear stage of a line B-B in FIG. 3.
Figure 5C:
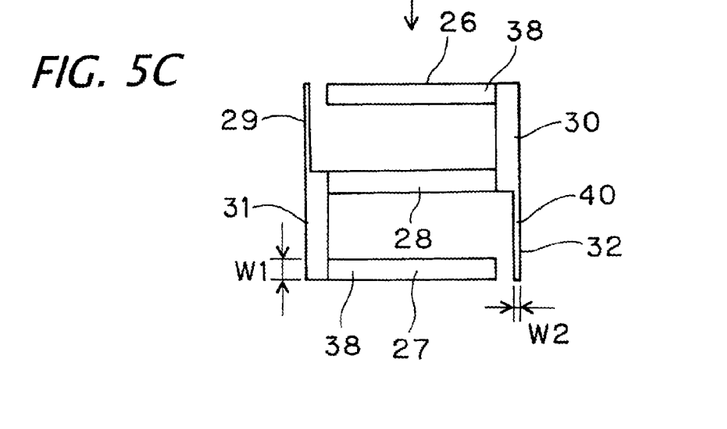
FIG. 5C is a plane view at a wear stage of a line C-C in FIG. 3.

In this example, the wear indicator 24 has three wear stages in the sipe depth direction H, and indicates "8" in a first wear stage (initial wear stage), "5" in a second wear stage (intermediate wear stage) and "2" in a third wear stage (end wear stage), as shown in FIGS. 5A to 5C.

To make the indication possible, in the present embodiment, the seven sipes 26 to 32 comprise four sipes 29 to 32 comprising the combination of the indication part 38 and the non-indication part 40 in the sipe depth direction H, and three sipes 26 to 28 in which the whole of the sipe depth direction H comprises the indication part 38.

In detail, three sipes of the uppermost sipe 26, the lowermost sipe 27 and the intermediate sipe 28, each extending in a lateral direction are formed into the indication part 38 having the first groove width W1 over the entire sipe depth direction H.

Figure 3:
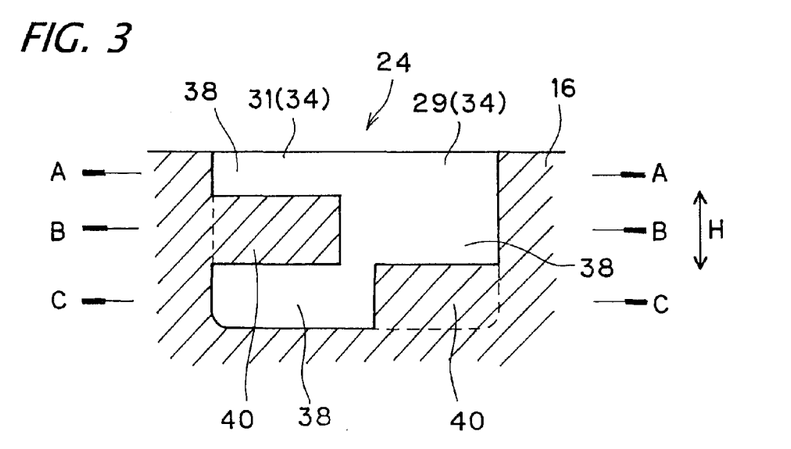
FIG. 3 is a cross-sectional view taken along a line III-III in FIG. 2.
Figure 4:
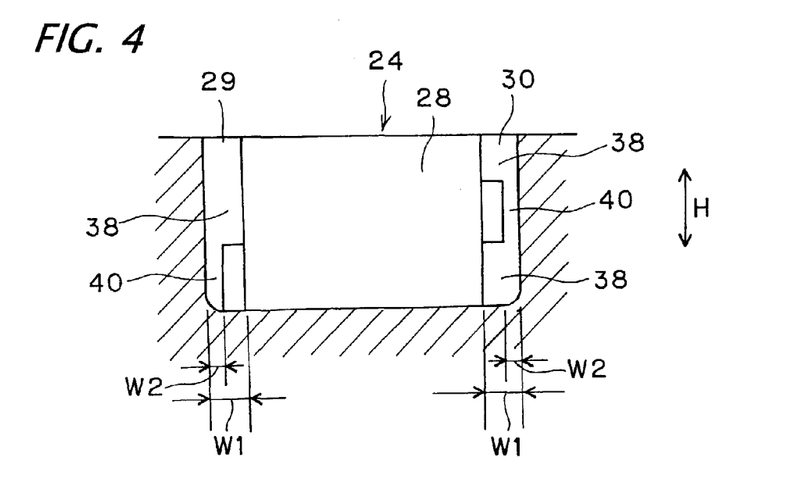
FIG. 4 is a cross-sectional view taken along a line IV-IV in FIG. 2.

On the other hand, the upper-left sipe 29 is formed into the indication part 38 having the first groove width W1 up to the depth of the first wear stage and the second wear stage from the tread surface, and into the non-indication part 40 having the second groove width W2 in the third wear stage, as shown in FIGS. 3 and 4. The lower-left sipe 31 is formed into the indication part 38 having the first groove width W1 up to the depth of the first wear stage from the tread surface, into the non-indication part 40 having the second groove width W2 in the second wear stage, and into the indication part 38 having the first groove width W1 in the third wear stage, as shown in FIG. 3. The upper-right sipe 30 is formed into the indication part 38 having the first groove width W1 up to the depth of the first wear stage from the tread surface, into the non-indication part 40 having the second groove width W2 in the second wear stage, and into the indication part 38 having the first groove width W1 in the third wear stage, as shown in FIG. 4. The lower-right sipe 32 is formed into the indication part 38 having the first groove width W1 up to the depth of the first wear stage and the second wear stage from the tread surface, and into the non-indication part 40 having the second groove width W2 in the third wear stage.

By this constitution, in the first wear stage, the seven sipes 26 to 32 are all the indication part 38 as shown in FIG. 5A. Therefore, "8" is indicated. In the second wear stage, the upper-right sipe 30 and the lower-left sipe 31 are the non-indication part 40, and other sipes 26 to 29 and 32 are the indication part 38 as shown in FIG. 5B. Therefore, "5" is indicated. In the third wear stage, the upper-left sipe 29 and the lower-right sipe 32 are the non-indication part 40, and other sipes 26 to 28, 30 and 31 are the indication part 38. Therefore, "2" is indicated.

Figure 6A:
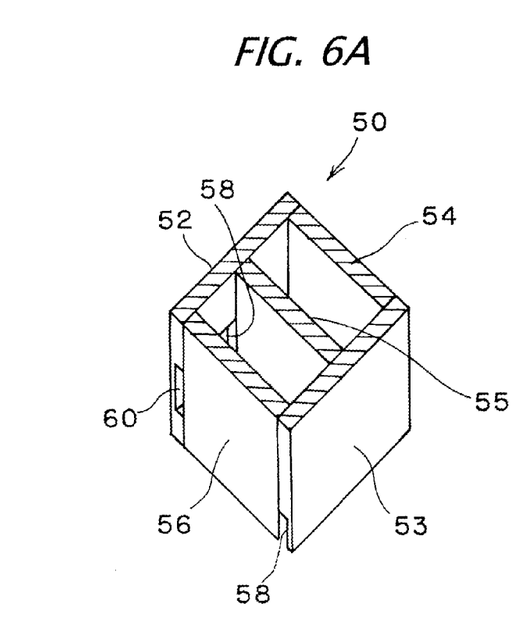
FIG. 6A shows a cut plane taken along the line A-A in FIG. 3.
Figure 6B:
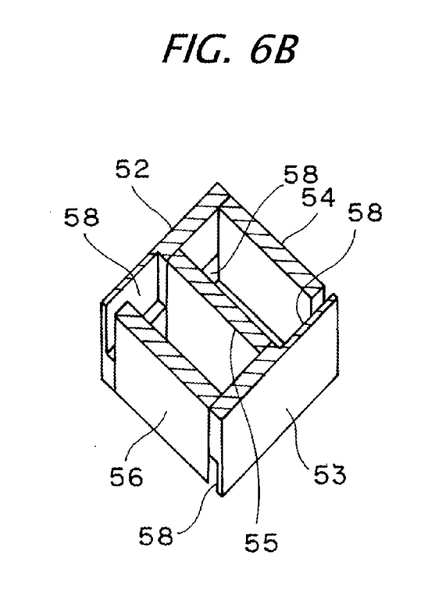
FIG. 6B shows a cut plane taken along the line B-B in FIG. 3.
Figure 6C:
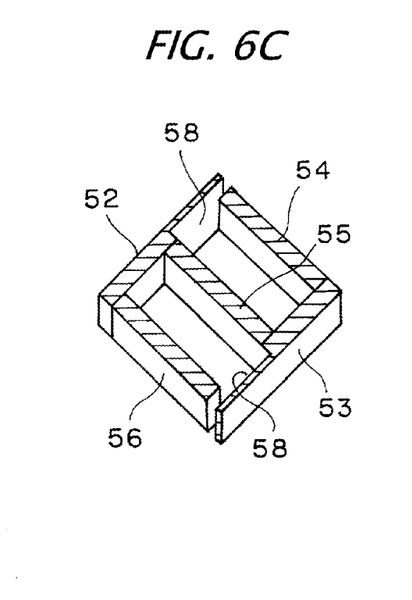
FIG. 6C shows a cut plane taken along the line C-C in FIG. 3.

FIGS. 6A to 6C show a molding blade 50 provided in a tire mold to mold the wear indicator 24. As described above, in this example, the upper-left sipe 29 and the lower-left sipe 31 are joined together and integrated to constitute the left side longitudinal sipe 34, and the upper-right sipe 30 and the lower-right sipe 32 are joined together and integrated to constitute the right side longitudinal sipe 36. Therefore, the molding blade 50 has a pair of right and left longitudinal blade pieces 52 and 53 for molding those right and left longitudinal sipes 34 and 36. The molding blade 50 further has three lateral blade pieces 54, 55 and 56 for molding three sipes 26 to 28 extending in a lateral direction. Thus, the molding blade 50 is constituted of the above five blade pieces.

Concave part 58 for providing the non-indication part 40 in a convex shape in the sipes 34 and 36 is provided in the right and left longitudinal blade pieces 52 and 53. On the other hand, the three lateral blade pieces 54, 55 and 56 have a plate shape having a constant thickness, free of such a concave part. In this example, the five blade pieces 52 to 56 are not joined together and integrated, and constitute the molding blade 50 by abutting the ends of the blade pieces 52 to 56 with each other. By this constitution, a long hole 60 is present in the abutting (touching) part as shown in FIG. 6A. Despite that a convex part constituting the non-indication part 40 is molded in the portion, demoldability of the convex part is ensured by the opening of the abutting part at the time of demolding.

In the example shown in FIGS. 6A to 6C, a marginal part of the concave part 58 is formed at a right angle, but to reduce demolding resistance, the marginal part of the concave part 58 may be provided by inclining in a demolding direction.

According to the above embodiment, the wear indicator 24 provided on the tread surface visually easily indicates the residual groove depth. In detail, in the first wear stage, the wear indicator 24 indicates "8" as shown in FIG. 5A. This indication means that the residual groove depth is 8 mm or more. When the wear proceeds and reaches the second wear stage, the wear indicator 24 indicates "5" as shown in FIG. 5B. This indication means that the residual groove depth is 5 mm or more. That is, the indication means that the residual groove depth is less than 8 mm, but is 5 mm or more. When the wear proceeds and reaches the third wear stage, the wear indicator 24 indicates "2" as shown in FIG. 5C. This indication means that the residual groove depth is 2 mm or more. That is, the indication means that the residual groove depth is less than 5 mm, but is 2 mm or more. When the wear further proceeds, the wear indicator 24 itself disappears, and it is seen that the time for tire replacement has come.

Thus, according to the present embodiment, the wear indicator 24 directly indicates the residual groove depth as a numeral. Therefore, regardless of a tire size and a groove depth, the residual groove depth can visually easily be indicated.

Furthermore, because the character is indicated using a sipe of a combination of the indication part 38 and the non-indication part 40 in the depth direction H of the sipe, various characters can be formed in the depth direction H of the sipe while ensuring demoldability of the molding blade 50 at the time of molding a tread in the non-indication part 40 having a small groove width. In detail, in the wear indicator 24, it is required that the numeral indicated becomes smaller toward the sipe bottom side, in order to directly indicate the residual groove depth. In this case, although it depends on the combination of the numerals to be indicated, the indication part 38 may be required to be provided at the sipe bottom side of the non-indication part 40. In such a case, where the above non-indication part 40 is not provided and this part is a shape having no sipe, the indication part 38 cannot be provided at the bottom side for the reason of demolding of the molding blade. On the other hand, by providing the non-indication part having a small groove width, even in the case that the indication part 38 is provided at the sipe bottom side, the blade part which molds the indication part 38 can be drawn through the sipe part of the non-indication part 40.

According to the present embodiment, the numerals indicated can stepwise be changed by the single wear indicator 24. Therefore, a plurality of indicators is not required to be provided side by side to indicate the residual groove depth in numeral, and this can suppress uneven wear. In particular, the non-indication part 40 has a small groove with as compared with the indication part 38. As a result, rigidity variation can be suppressed at this part, resulting in suppression of uneven wear.

According to the present embodiment, the right and left sipes are constituted of the longitudinal sipes 34 and 35 joined together and integrated, respectively. As a result, the longitudinal blade pieces 52 and 53 for molding those can mutually be reinforced in upper and lower directions, whereby durability of the molding blade 50 can be improved. In detail, in this example, concave parts 58 are alternately provided in the longitudinal blade pieces 52 and 53 in a longitudinal direction. Therefore, a thin portion in the concave part provided at one side in the longitudinal direction can be reinforced with a thick portion at other side, and deformation of the molding blade 50 can be suppressed. In this example, the sipes 26, 27 and 28 extending in a lateral direction each consist of the wide indication part 38. Therefore, a thin portion due to the concave portion is not present in the lateral blade pieces 54, 55 and 56, and from this point, deformation of the molding blade 50 can be suppressed.

Second Embodiment

Figure 7A:
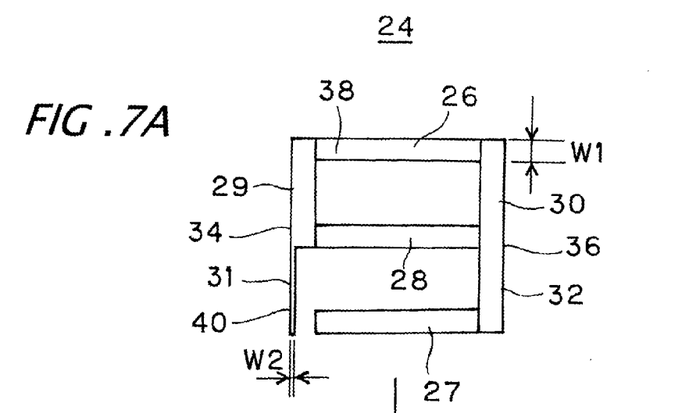
FIGS. 7A to 7C are plane views at each wear stage of a wear indicator according to a second embodiment.
Figure 7B:
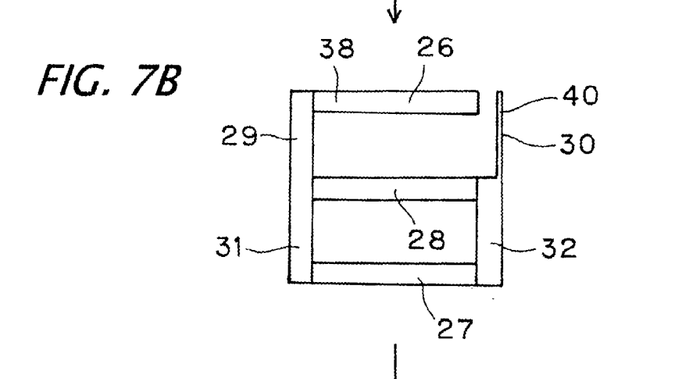
Figure 7C:
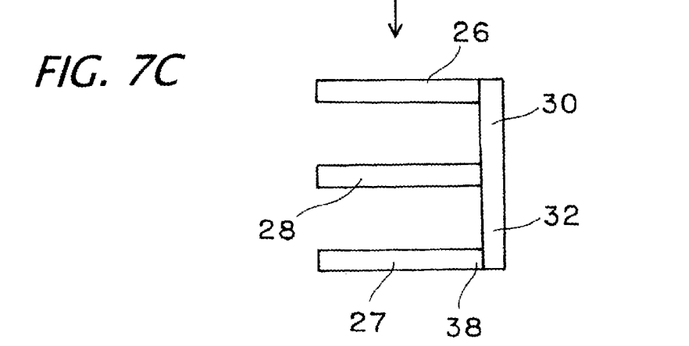

FIGS. 7A to 7C show the indication constitution at each wear stage of the wear indicator 24 according to a second embodiment. As shown in the drawings, in this example, the wear indicator 24 indicates "9" in a first wear stage (initial stage of wear), "6" in a second wear stage (intermediate stage of wear) and "3" in a third wear stage (end stage of wear).

To make the indication possible, in this example, three sipes of the uppermost sipe 26, the lowermost sipe 27 and the intermediate sipe 28, extending in the lateral direction each are formed into the indication part 38 having the first groove width W1 over the entire depth direction H of the sipe. The lower-right sipe 32 is also formed into the indication part 38 having the first groove width W1 over the entire depth direction H of the sipe.

On the other hand, the upper-right sipe 30 is formed into the indication part 38 having the first groove width W1 up to the depth of the first wear stage from the tread surface, the non-indication part 40 having the second groove width W2 in the second wear stage, and the indication part 38 having the first groove width W1 in the third wear stage.

The upper-left sipe 29 is formed into the indication part 38 having the first groove width W1 up to the depth of the first wear stage and the second wear stage from the tread surface, terminates there, and disappears in the third wear stage. The lower-left sipe 31 is formed into the non-indication part 40 having the second groove width W2 up to the depth of the first wear stage from the tread surface and the indication part 38 having the first groove width W1 in the second wear stage, terminates there, and disappears in the third stage.

The second embodiment is the same as in the first embodiment in that the right and left sipes are joined with each other and integrated, and constitute the longitudinal sipes 34 and 36 extending in the entire longitudinal direction.

By this constitution, as shown in FIG. 7A, the lower-left sipe 31 is the non-indication part 40 and other sipes 26 to 30 and 32 are the indication part 38, in the first wear stage. Therefore, "9" is indicated. As shown in FIG. 7B, the upper-right sipe 30 is the non-indication part 40 and other sipes 26 to 29, 31 and 32 are the indication sipe 38, in the second wear stage. Therefore, "6" is indicated. As shown in FIG. 7C, the upper-left sipe 29 and the lower-left sipe 31 disappear and other sipes 26 to 28, 30 and 31 are the indication part 38, in the third wear stage. Therefore, "3" is indicated.

Thus, in forming the indication at the final wear stage, the non-indication part 40 is no longer required to provide. Therefore, by eliminating the sipe at that part, a thin part for molding the non-indication part 40 is not required to provide at the tip of the blade piece, and durability of the molding blade can be improved. Other constitutions and effects in the second embodiment are basically the same as in the first embodiment, and the descriptions thereof are omitted.

Third Embodiment

FIGS. 8A to 8D show the indication constitution at each wear stage of the wear indicator 24 according to a third embodiment. As shown in the drawings, in this example, the wear indicator 24 has four wear stages in the depth direction H of the sipe, and indicates "0" in a first wear stage which is an initial stage of wear, "7" in a second wear stage, "4" in a third wear stage and "1" in a fourth wear stage which is the end stage of wear.

To make the indication possible, in this example, the right side longitudinal sipe 36 comprising the upper-right sipe 30 and the lower-right sipe 32 is formed into the indication part 38 having the first groove width W1 over the entire depth direction H of the sipe. The uppermost sipe 26 is formed into the indication part 38 having the first groove width W1 up to the depth of the first wear stage and the second wear stage, terminates there, and disappears in and after the third wear stage. The lowermost sipe 27 is formed into the indication part 38 having the first groove width W1 up to the depth of the first wear stage, terminates there, and disappears in and after the second wear stage. The intermediate sipe 28 is formed into the non-indication part 40 having the second groove width W2 up to the depth of the first wear stage and the second wear stage and into the indication part 38 having the first groove width W1 in the third wear stage, terminates there and disappears in the fourth wear stage. The upper-left sipe 29 is formed into the indication part 38 having the first groove width W1 up to the depth of from the first wear stage to the third wear stage, terminates there and disappears in the fourth wear stage. The lower-left sipe 31 is formed into the indication part 38 having the first groove width W1 up to the depth of the first wear stage, terminates there and disappears in and after the second wear stage.

The third embodiment is the same as in the first embodiment in that the right and left sipes are joined together and integrated to constitute the longitudinal sipes 34 and 36 extending in the entire longitudinal direction.

Figure 8A:
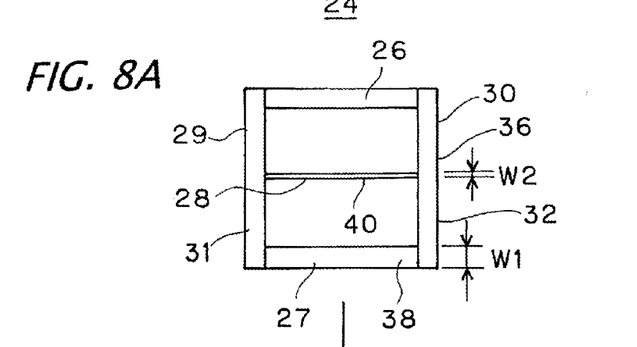
FIGS. 8A to 8D are plane views at each wear stage of a wear indicator according to a third embodiment.
Figure 8B:
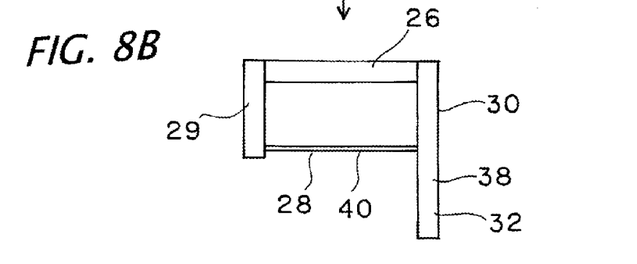
Figure 8C:
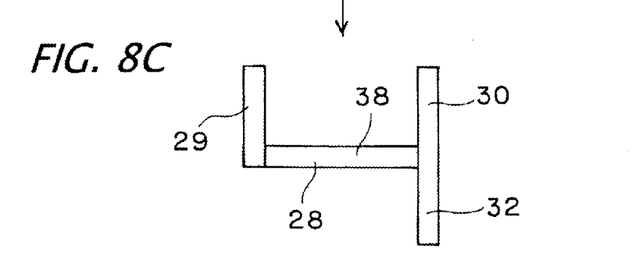
Figure 8D:
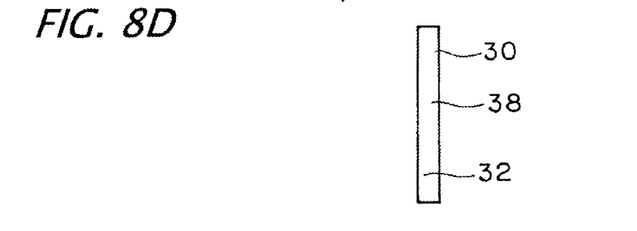

By this constitution, as shown in FIG. 8A, the intermediate sipe 28 is the non-indication part 40 and other sipes 26, 27 and 29 to 32 are the indication part 38, in the first wear stage. Therefore, "0" is indicated. This indication means that the residual groove depth is 10 mm or more. As shown in FIG. 8B, the intermediate sipe 28 is the non-indication part 40, the lowermost sipe 27 and the lower-left sipe 31 disappear and other sipes 26, 29, 30 and 32 are the indication sipe 38, in the second wear stage. Therefore, "7" is indicated. As shown in FIG. 8C, the uppermost sipe 26, the lowermost sipe 27 and the lower-left sipe 31 disappear and other sipes 28, 29, 30 and 32 are the indication part 38, in the third wear stage. Therefore, "4" is indicated. As shown in FIG. 8D, the upper-right sipe 30 and the lower-right sipe 32 are the indication part 38 and other sipes 26 to 29 and 31 disappear, in the fourth wear stage. Therefore, "1" is indicated.

Thus, in the case that further indication part 38 is not located at the sipe bottom side of the indication part 38, the non-indication part 40 is no longer necessary thereafter. Therefore, by eliminating the sipe at that part, a thin portion for molding the non-indication part 40 is not required to provide at the tip of the blade piece, and durability of the molding blade can be improved. Other constitutions and effects in the third embodiment are basically the same as in the first embodiment, and the descriptions thereof are omitted.

Fourth Embodiment

Fourth embodiment differs from the first embodiment in that the right and left longitudinal sipes 34 and 36 and the intermediate sipe 28 are joined together and integrated to form a single sipe having H-shape in the first embodiment. The structure thus joined and integrated can be molded by joining and integrating right and left longitudinal blades 52 and 53 of the molding blade 50 and the central lateral blade 55.

This structure can further improve durability of the molding blade 50. In this case, the uppermost sipe 26 and the lowermost sipe 27 are not joined and integrated with the right and left longitudinal sipes 34 and 36, and have the constitution that the ends thereof are touched with each other. Therefore, the problem due to the presence of the long hole 60 does not occur.

In this example, the uppermost sipe 26 and the lowermost sipe 27 have not been joined and integrated with the right and left longitudinal sipes 34 and 36. However, depending on the combination of the numerals to be indicated, those can be joined and integrated without the problem of demoldability, whereby durability can be improved. For example, in the second embodiment shown in FIG. 7, the uppermost sipe 26 can be joined and integrated with the left side longitudinal sipe 34, and the lowermost sipe 27 can be joined and integrated with the right side longitudinal sipe 36, whereby durability of the molding blade can be improved.

Other Embodiment

The above-described embodiments are described the case that the entire depth direction H comprises the indication part 38 as the seven sipes 26 to 32. However, in the present invention, all of the seven sipes 26 to 32 may be a sipe that the indication part 38 and the non-indication part 40 have been combined in the depth direction H of the sipe.

In the above-described embodiments, the wear indicator 24 was partitioned into three or four regions (wear stages) in the depth direction H of the sipe. However, in the present invention, the wear indicator 24 may be partitioned into two regions or five or more regions. From the relationship with the groove depth of the main groove, it is preferred that three to five wear stages are provided and the numerals are gradually decreased in each wear stage.

In the above embodiments, the wear indicator 24 indicates Arabic numerals, but various characters capable of being indicated by seven segment displays, such as Latin characters such as A, b, c, d, E and F, can be indicated so as to indicate the wear amount (residual groove depth). Although not exemplified, various modifications or changes can be made without departing the spirit and scope of the present invention.

What is claimed is:

1. A pneumatic tire having a wear indicator formed by a sipe on a tread surface wherein
    the wear indicator comprises seven sipes of an uppermost sipe extending in a lateral direction in an uppermost part a lowermost sipe extending in a lateral direction in a lowermost part an intermediate sipe extending in a lateral direction at an intermediate position between the uppermost sipe and the lowermost sipe an upper-left sipe and an upper-right sipe extending in a longitudinal direction connecting ends of the uppermost sipe and the intermediate sipe with each other and a lower-left sipe and a lower-right sipe extending in a longitudinal direction connecting ends of the lowermost sipe and the intermediate sipe with each other;
    the seven sipes each comprise an indication part having a first groove width and used to indicate a character and a non-indication part having a second groove width smaller than the first groove width and not used to indicate a character in combination in a depth direction of the sipe or comprise the indication part in the entire depth direction of the sipe at least one sipe comprising a combination of the indication part and the non-indication part; and
    the wear indicator indicates a single character by the combination of the indication parts in the seven sipes and is that the combination of the indication parts is stepwise changed in a depth direction of the sipe such that the character is stepwise changed in the depth direction of the sipe
    wherein the at least one sipe has the indication part at a sipe bottom side of the non-indication part.

2. The pneumatic tire according to claim 1, wherein the wear indicator has at least three wear stages in a depth direction of the sipe and indicates a different character in each wear stage.

3. The pneumatic tire according to claim 1, wherein the character is an Arabic numeral.

4. The pneumatic tire according to claim 3, wherein the numeral indicated by the wear indicator becomes smaller toward the sipe bottom side.

5. The pneumatic tire according to claim 1, wherein the upper-left sipe and the lower-left sipe are joined together and integrated to constitute a left side longitudinal sipe extending in the entire longitudinal direction and the upper-right sipe and the lower-right sipe are joined together and integrated to constitute a right side longitudinal sipe extending in the entire longitudinal direction.

6. The pneumatic tire according to claim 5, wherein at least one of the right and left longitudinal sipes and at least one of the uppermost lowermost and intermediate sipes extending in the lateral direction are joined together and integrated to constitute a single sipe.

7. The pneumatic tire according to claim 1, wherein the second groove width of the non-indication part is ½ or less of the first groove width of the indication part.

8. The pneumatic tire according to claim 1, wherein the second groove width of the non-indication part is ⅓ or less of the first groove width of the indication part.

9. The pneumatic tire according to claim 1, wherein the seven sipes include a sipe in which the entire depth direction of the sipe comprises the indication part.

* * * * *